Sept. 15, 1931.   H. LUDWIG   1,823,835
SHOCK ABSORBER
Filed Sept. 19, 1928

H. Ludwig
INVENTOR

By Marks & Clerk
ATTYS.

Patented Sept. 15, 1931

1,823,835

UNITED STATES PATENT OFFICE

HANS LUDWIG, OF HOMBURG VOR DER HOHE, GERMANY, ASSIGNOR OF ONE-HALF TO STEMPELWERK GESELLSCHAFT MIT BESCHRANKTER HAFTUNG, OF FECHENHEIM, FRANKFORT-ON-THE-MAIN, GERMANY

SHOCK ABSORBER

Application filed September 19, 1928, Serial No. 307,003, and in Germany October 29, 1927.

This invention relates to a shock absorber, more particularly for automobile vehicles, in which the damping action is brought about in a known manner by a brake band, which is pulled frictionally over a surface.

The advantages of the present invention, as compared with known devices of a similar type, consist in the fact that this surface is resilient, as a result of which the damping acts smoothly, and that furthermore, by suitable fastening and adjusting devices, the degree of damping can be accurately regulated.

The invention is illustrated by way of example in the accompanying drawings, wherein Fig. 1 is a front elevation of a shock absorber, with the cover removed;

Figure 1:
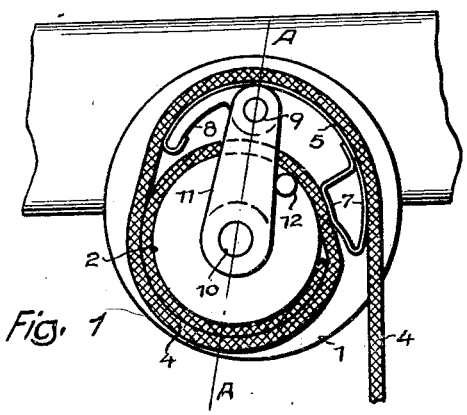
Figure 2:
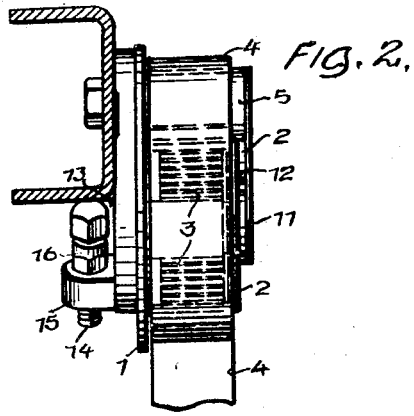
Fig. 2 is a cross section on the line A—A in Fig. 1.

In the shock absorber illustrated, certain known details are provided. These consist in a base plate 1, upon which is rotatably mounted a drum 2, which is subject to the influence of a plate spring 3. To the drum 2 is secured the inner end of a brake band 4, which passes twice round the drum and then over a lever to the axle of the vehicle.

The present invention consists in substituting for the brake lever a resiliently acting braking member, and further consists in an adjusting and clamping device associated therewith.

Above the drum 2 is fitted a flange 8 which is rigidly connected with the base plate 1 and which serves at the same time as a hub for a fastening bolt 9. Over the flange 8 is drawn a spring 5, which consists of strip steel or of hard brass, and which is formed at its right-hand free end into a loop 7, and rests with this loop upon the inside turn of the brake band 4. The bolt 9 is arranged in the neighbourhood of the upper edge of the shock absorber and thereby enables it to be easily fitted to the vehicle frame, even when space is limited. Since the bolt 9 has to take up great compressive forces it is connected with the shaft 10 of the drum 2 by a stiffening plate 11. The latter serves at the same time as a two-sided stop for a bolt 12 mounted on the drum 2, and limits the movement thereof in both directions.

Figure 3:
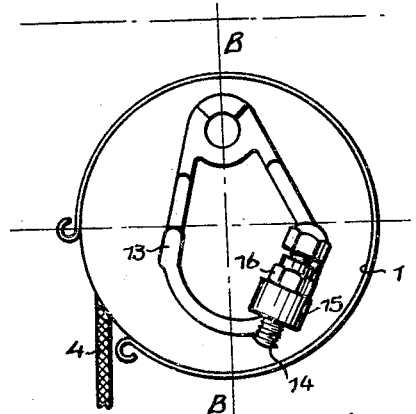
Fig. 3 is a back view of the shock absorber showing the adjusting device.

The adjusting and altering of the damping action is effected as indicated in Fig. 3 by rotating the entire shock absorber about the fastening bolt 9, which is first somewhat slackened, and even small rotations already show considerable alterations in the damping action. On this ground a device for fine adjustment is necessary, and this is provided on the back of the base plate 1, as shown in Fig. 3. On one side of the straight line B passing through the fastening bolt 9 and the centre of the shock absorber is provided a fixed abutment 13. On the other side of the said line is located the adjusting device, consisting of a screw 14 with a hemispherical head, this screw being displaceable in a projection 15 on the base plate 1, and admitting of being locked to the said projection by means of a lock nut 16. The screw 14 may also be used with the end of the bolt for adjusting purposes, in which case the lock nut comes on the other side of the projection 15.

The shock absorber acts in such a manner that in the case of shocks to the road wheel of the vehicle a loosening of the brake band 4 takes place, which however is immediately compensated for by the spring 3. Upon the carriage spring re-acting the brake band 4 is pulled tight over the braking spring 5, which moreover presses with the loop 7 against the inner turn of the brake band 4, as a result of which resilient friction is produced at both points, and the oscillations of the carriage spring are damped. The fixed flange 8 under these circumstances prevents the brake band 4 from bending at an angle. The adjusting of the shock absorber is effected when necessary according to the result observed, by rocking the entire shock absorber to a suitable extent about the loosened bolt 9 by rotating the screw 14.

Figure 4:
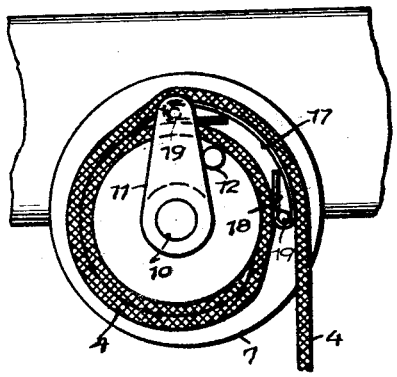
Fig. 4 shows the shock absorber with a second constructional form of the brake spring.

The second constructional form of the braking spring, shown in Fig. 4, comprises a steel band 17, which is bent at both ends into loops 18, and mounted by them upon two pins 19 secured in the base plate 1. The diameter of the spring loops 18 is greater than the thickness of the pins, in order that the brake band 4 may not subject the pins 19 to a bending stress. Such a brake spring, besides simplifying manufacture, causes a considerable reduction in the size of the shock absorber, and facilitates the fitting thereof to the vehicle. The method of working of the brake spring 17 is distinctive, inasmuch as when deflecting it bears upon the ends of the loops 18, their resistance thus being reinforced.

Figure 6:
Fig. 6 shows a third constructional form of the brake spring.

This circumstance becomes still more obvious in a further constructional form of the brake spring, which is shown in Fig. 6. Here the spring 17 is held fast to the base plate 1 merely by a single pin 19, round which the loop 18 is passed so far that no longitudinal displacement can occur. In this form the ends of the spring lie directly on the under surface of the spring 17 and thereby yield the effect of a laminated spring.

Figure 5:
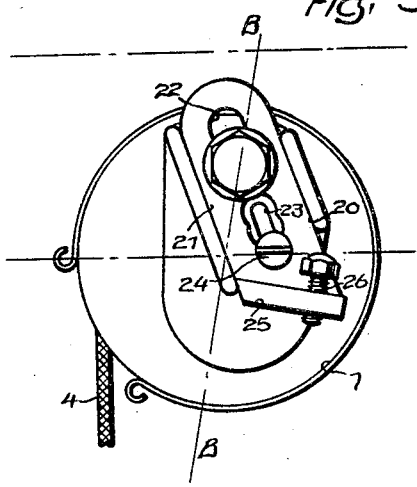
Fig. 5 is a back view of the shock absorber with a modified constructional form of the adjusting device.

A second constructional form of the adjusting device consists, as shown in Fig. 5, in arranging upon the back of the shock absorber, obliquely to the rectilinear axis B, a broad guiding groove 20, in which an adjusting angle bar 21 is slidable for coarse adjustment. This coarse adjustment must be effected before fitting the shock absorber to the vehicle frame and for this purpose there is provided in the angle bar 21 a slot 22 for the fastening bolt 9 and a second slot 23 with conical notches for the head of a locking screw 24, whereby any tendency to shake loose automatically owing to vibration of the vehicle is prevented. In the flange 25 of the angle bar 21, which is bent at right angles, is adjustably arranged a screw 26, which serves for the fine adjustment of the shock absorber.

The guiding groove 20 may coincide with the rectilinear axis B instead of being oblique thereto, and the bent-up flange 25 of the angle bar 21 is then joggled sideways, in order to give the screw 26 the requisite leverage in relation to the rectilinear axis B.

What I claim is:—

1. A shock absorber, more particularly for automobile vehicles, comprising a base plate, a drum rotatably mounted on the base plate, a drum spring tending to rotate the drum in one direction, a brake band passing twice round the drum and tending to rotate the drum in the opposite direction, a brake spring interposed between the inner and outer turns of the brake band and means for holding one end of the brake spring in position on the base plate, the free end of the brake spring being bent so as to bear against the inner turn of the brake band, as and for the purpose set forth.

2. A shock absorber, more particularly for automobile vehicles, comprising a base plate, a drum rotatably mounted on the base plate, a drum spring tending to rotate the drum in one direction, a brake band passing twice round the drum and tending to rotate it in the opposite direction, a brake spring interposed between the inner and outer turns of the brake band, and means for holding one end of the brake spring in position on the base plate, the free end of the brake spring being bent into a loop which bears against the inner turn of the brake band.

3. A shock absorber, more particularly for automobile vehicles, comprising a base plate, a flange rigidly connected with the base plate, a drum rotatably mounted on the base plate, a drum spring tending to rotate the drum in one direction, a brake band passing twice round the drum and tending to rotate it in the opposite direction, the inner turn of the brake band passing inside the flange and the outer turn passing outside the flange, and a brake spring interposed between the inner and outer turns of the brake band, said brake spring being secured at one end to the flange and being bent at the free end into a loop which bears against the inner turn of the brake band.

4. A shock absorber, more particularly for automobile vehicles, comprising a base plate, two pins projecting from the face of the base plate, a drum rotatably mounted on the base plate, a drum spring tending to rotate the drum in one direction, a brake band passing twice round the drum and tending to rotate it in the opposite direction, the inner turn of the brake band passing inside the two pins and the outer turn passing outside the two pins, and a brake spring interposed between the inner and outer turns of the brake band, said brake spring being bent at both ends into loops and being loosely mounted by said loops on the two pins.

5. A shock absorber, more particularly for automobile vehicles, comprising a base plate, two pins projecting from the face of the base plate, a drum rotatably mounted on the base plate, a drum spring tending to rotate the drum in one direction, a brake band passing twice round the drum and tending to rotate it in the opposite direction, the inner turn of the brake band passing inside the two pins and the outer turn passing outside the two pins, and a brake spring interposed between the inner and outer turns of the brake band, said brake spring being bent at both ends into loops and being loosely mounted by said loops on the two pins, with the ends of the brake spring bearing against the internal surface of said brake spring.

6. A shock absorber, more particularly for automobile vehicles, comprising a base plate, a fastening bolt arranged in the neighbourhood of the upper edge of the base plate, a drum rotatably mounted on the base plate, a drum spring influencing the drum, a brake band passing twice round the drum, a brake spring interposed between the inner and outer turns of the brake band and means on said base plate for rotating the entire shock absorber about the fastening bolt, for the purpose set forth.

7. A shock absorber, more particularly for automobile vehicles, comprising a base plate, a fastening bolt arranged in the neighbourhood of the upper edge of the base plate, an axle bolt secured to the base plate, a drum rotatably mounted on the axle bolt, a stiffening plate connecting the axle bolt with the fastening bolt, a drum spring influencing the drum, a brake band passing twice around the drum, and a brake spring interposed between the inner and outer turns of the brake band.

8. A shock absorber, more particularly for automobile vehicles, comprising a base plate, a fastening bolt arranged in the neighbourhood of the edge of the base plate, an axle bolt secured to the base plate, a drum rotatably mounted on the axle bolt, a drum spring influencing the drum, a brake band passing twice round the drum, a brake spring interposed between the inner and outer turns of the brake band, a fixed abutment secured to the back of the base plate to one side of a straight line passing through the centres of the fastening bolt and of the shock absorber, an adjusting screw mounted on the back of the base plate on the other side of the said straight line, and a lock nut co-operating with the adjusting screw.

9. A shock absorber, more particularly for automobile vehicles, comprising a base plate, a fastening bolt arranged in the neighbourhood of the edge of the base plate, an axle bolt secured to the base plate, a drum rotatably mounted on the axle bolt, a drum spring influencing the drum, a brake band passing twice round the drum, a brake spring interposed between the inner and outer turns of the brake band, a guide on the back of the base plate, an angle bar adapted to slide in the guide for coarse adjustment, the web of the angle bar being formed with a slot adapted to fit over the fastening bolt and with a second slot, a locking screw adapted to pass through said second slot, and a screw for fine adjustment passing through the flange of the angle bar.

10. A shock absorber, more particularly for automobile vehicles, comprising a base plate, a fastening bolt arranged in the neighbourhood of the edge of the base plate, an axle bolt secured to the base plate, a drum rotatably mounted on the axle bolt, a drum spring influencing the drum, a brake band passing twice round the drum, and a brake spring interposed between the inner and outer turns of the brake band, a channel-shaped guide on the back of the base plate, said guide making an acute angle with a straight line passing through the centres of the fastening bolt and of the shock absorber, an angle bar adapted to slide in the guide for coarse adjustment, the web of the angle bar being formed with a slot adapted to fit over the fastening bolt and with a second slot, a locking screw adapted to pass through said second slot, and a screw for fine adjustment passing through the flange of the angle bar.

In testimony whereof I have signed my name to this specification.

HANS LUDWIG.